Oct. 16, 1951 W. N. LINDSAY ET AL 2,571,459
METHOD OF AND APPARATUS FOR PRODUCING DRIED WHOLE EGGS
Filed Nov. 5, 1945 13 Sheets-Sheet 1

INVENTORS:
WESLEY N. LINDSAY
PAUL C. WILBUR
BY
ATTORNEY

Oct. 16, 1951  W. N. LINDSAY ET AL  2,571,459
METHOD OF AND APPARATUS FOR PRODUCING DRIED WHOLE EGGS
Filed Nov. 5, 1945  13 Sheets-Sheet 2
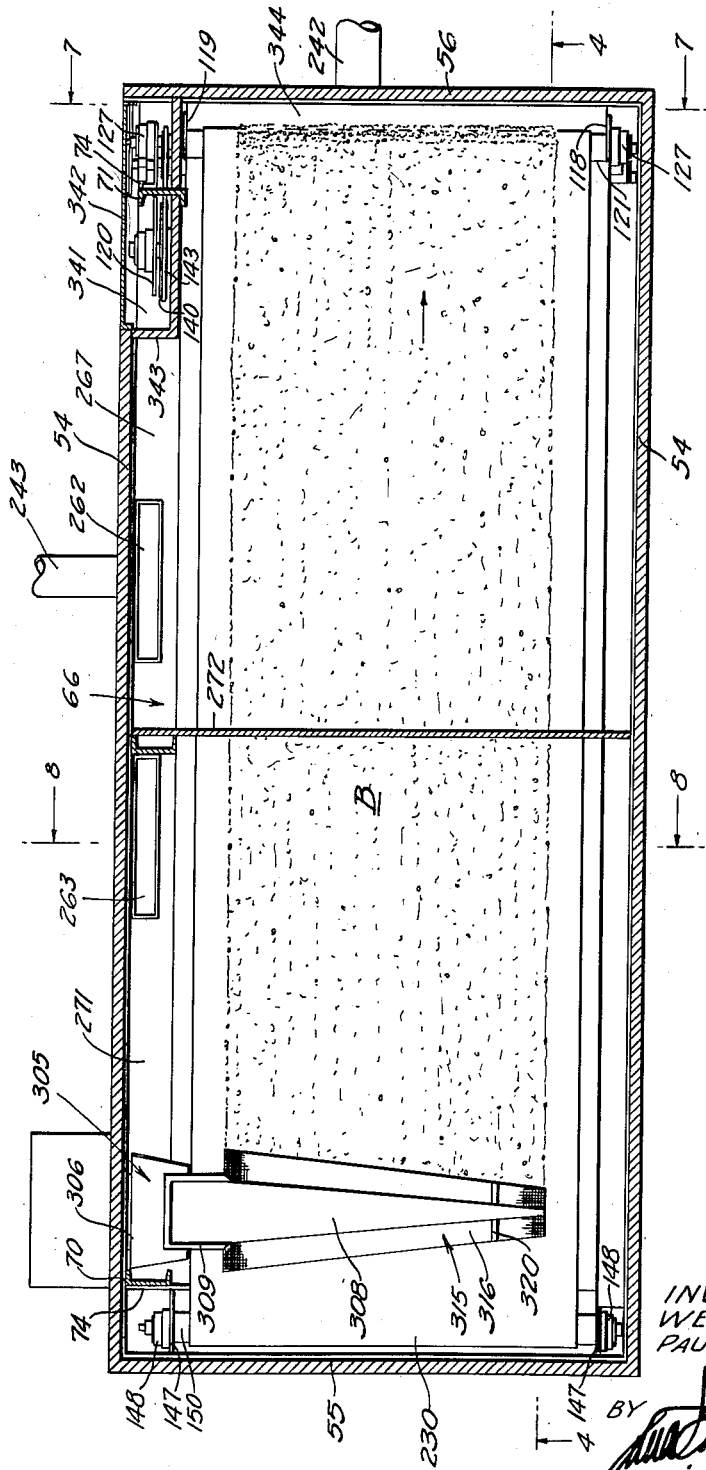
INVENTORS:
WESLEY N. LINDSAY
PAUL C. WILBUR
BY
ATTORNEY

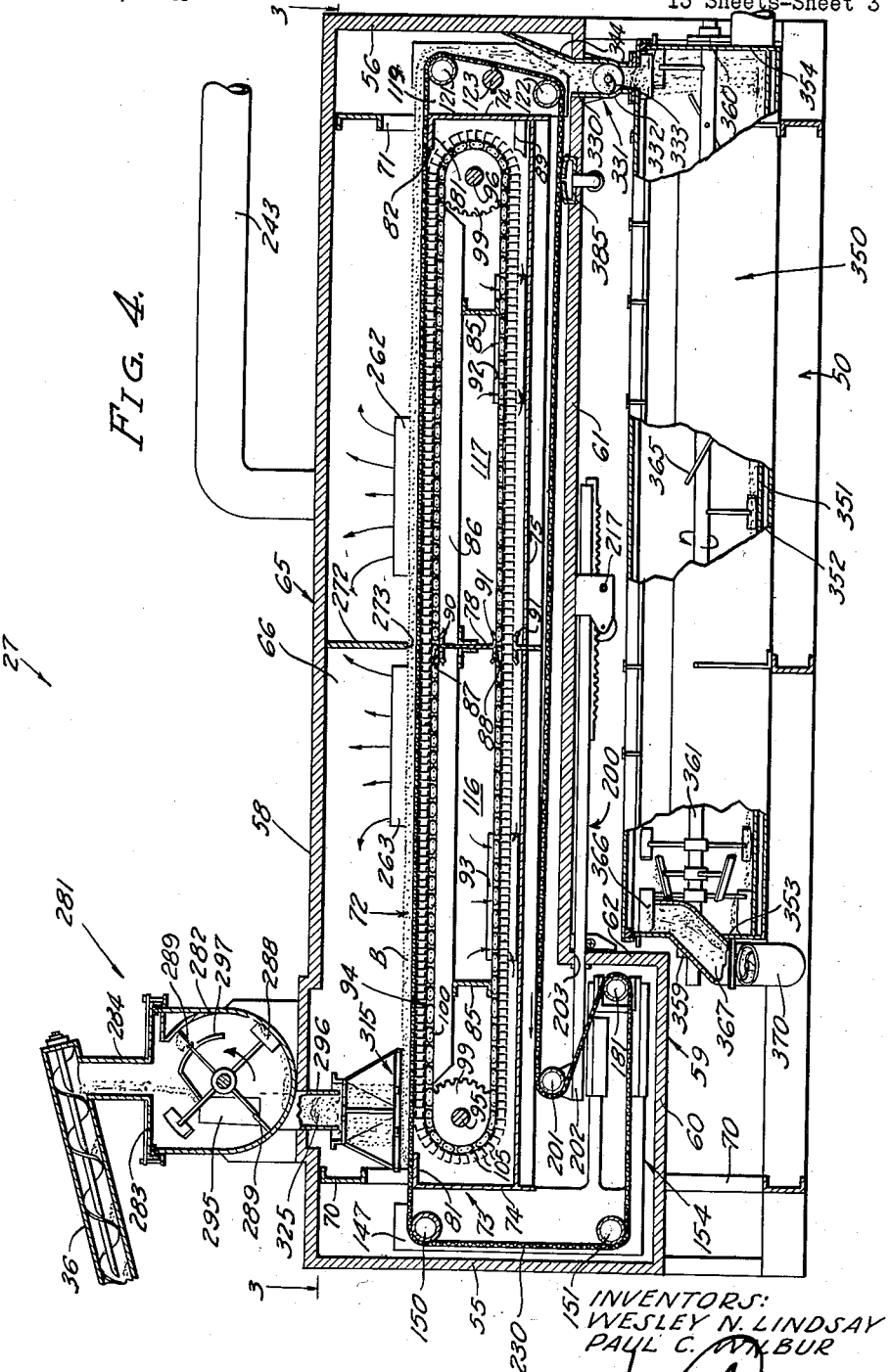

Oct. 16, 1951 W. N. LINDSAY ET AL 2,571,459
METHOD OF AND APPARATUS FOR PRODUCING DRIED WHOLE EGGS
Filed Nov. 5, 1945 13 Sheets-Sheet 4
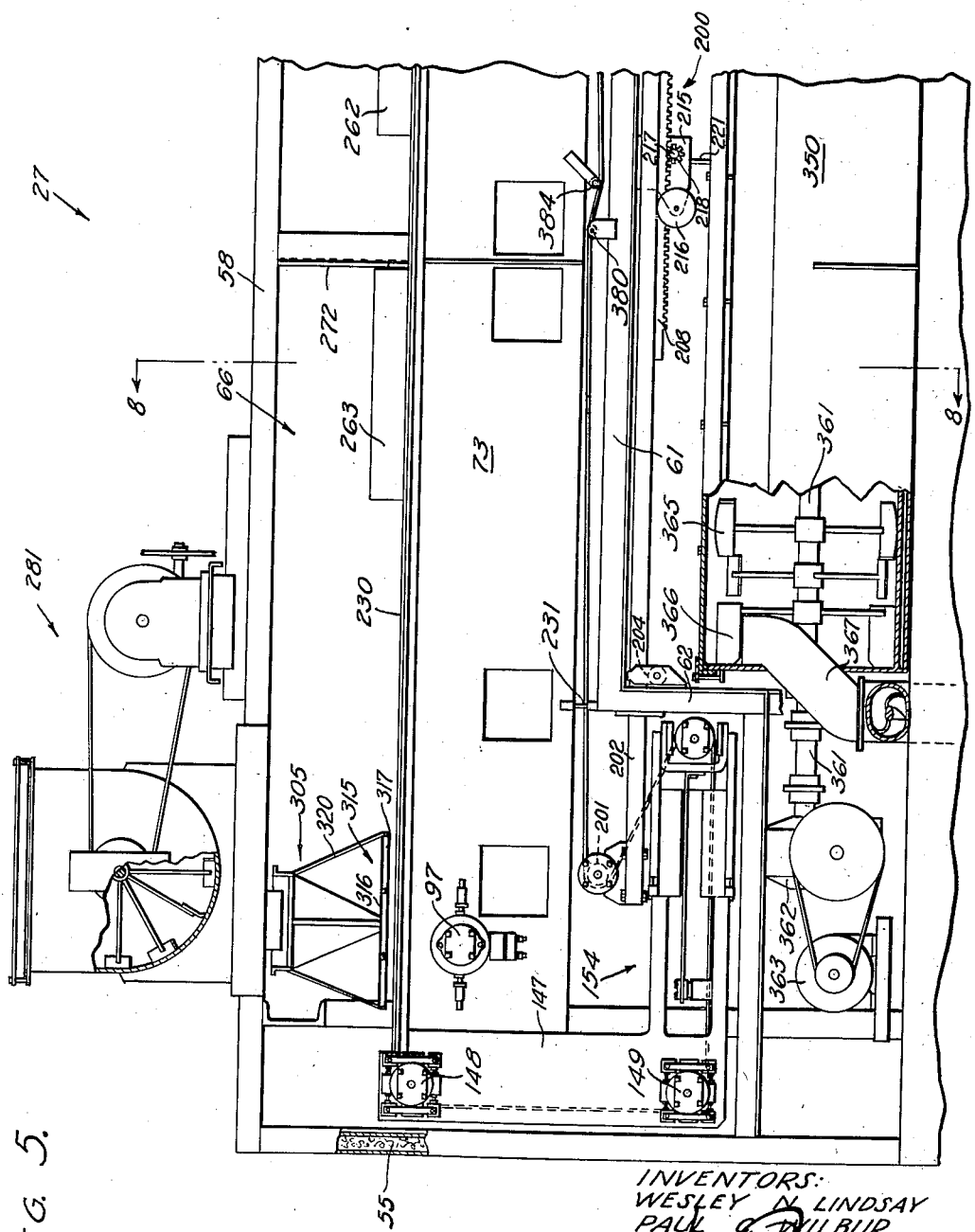
FIG. 5.
INVENTORS:
WESLEY N. LINDSAY
PAUL C. WILBUR
BY 
ATTORNEY Oct. 16, 1951   W. N. LINDSAY ET AL   2,571,459
METHOD OF AND APPARATUS FOR PRODUCING DRIED WHOLE EGGS
Filed Nov. 5, 1945   13 Sheets-Sheet 5

INVENTORS:
WESLEY N. LINDSAY
PAUL C. WILBUR
BY
ATTORNEY

INVENTORS:
WESLEY N. LINDSAY
PAUL C. WILBUR
BY
ATTORNEY

Oct. 16, 1951 W. N. LINDSAY ET AL 2,571,459
METHOD OF AND APPARATUS FOR PRODUCING DRIED WHOLE EGGS
Filed Nov. 5, 1945 13 Sheets-Sheet 7
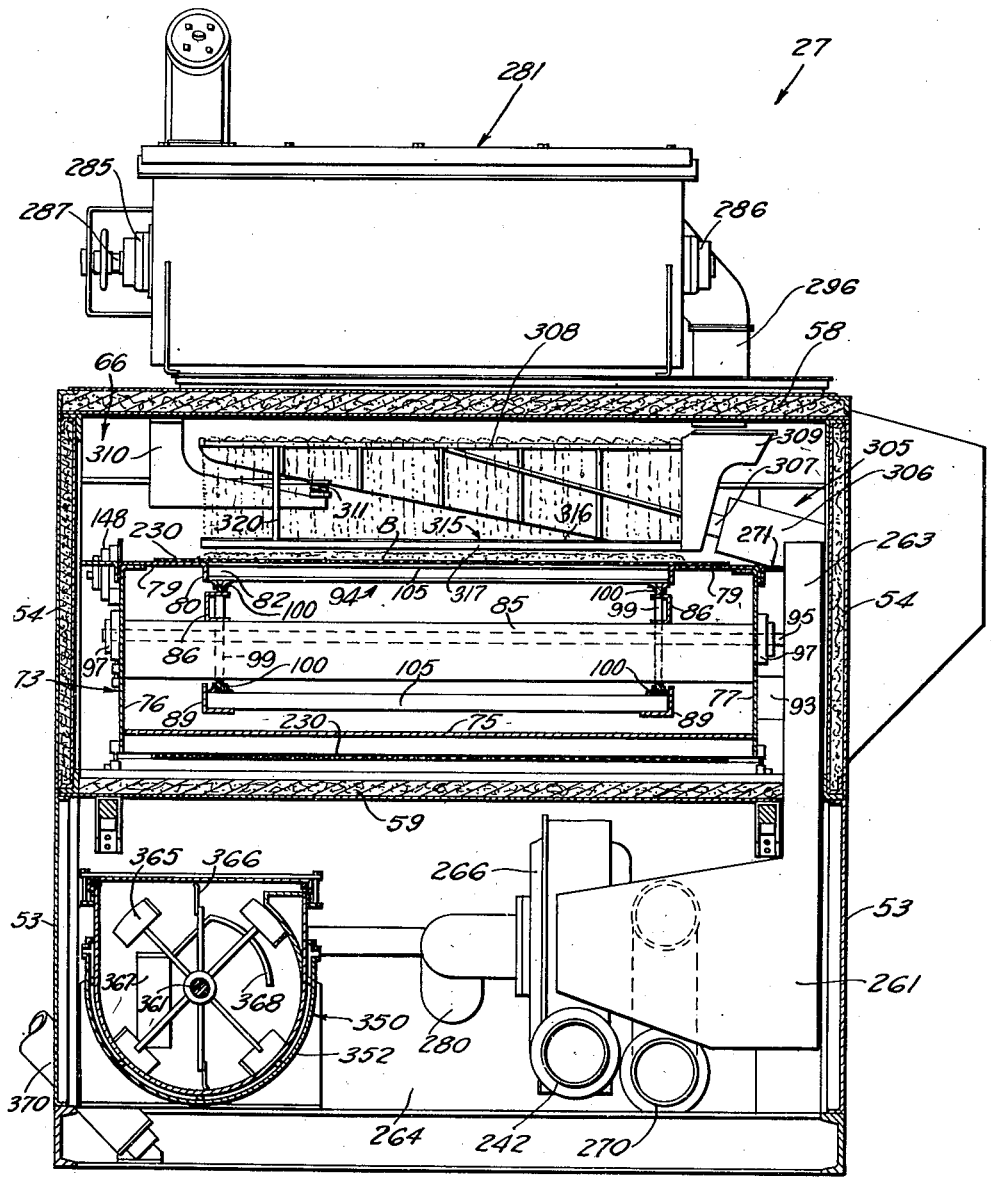
FIG. 8.
INVENTORS:
WESLEY N. LINDSAY
PAUL C. WILBUR
BY 
ATTORNEY Oct. 16, 1951     W. N. LINDSAY ET AL     2,571,459
METHOD OF AND APPARATUS FOR PRODUCING DRIED WHOLE EGGS
Filed Nov. 5, 1945     13 Sheets-Sheet 8

INVENTORS:
WESLEY N. LINDSAY
PAUL C. WILBUR
BY
ATTORNEY

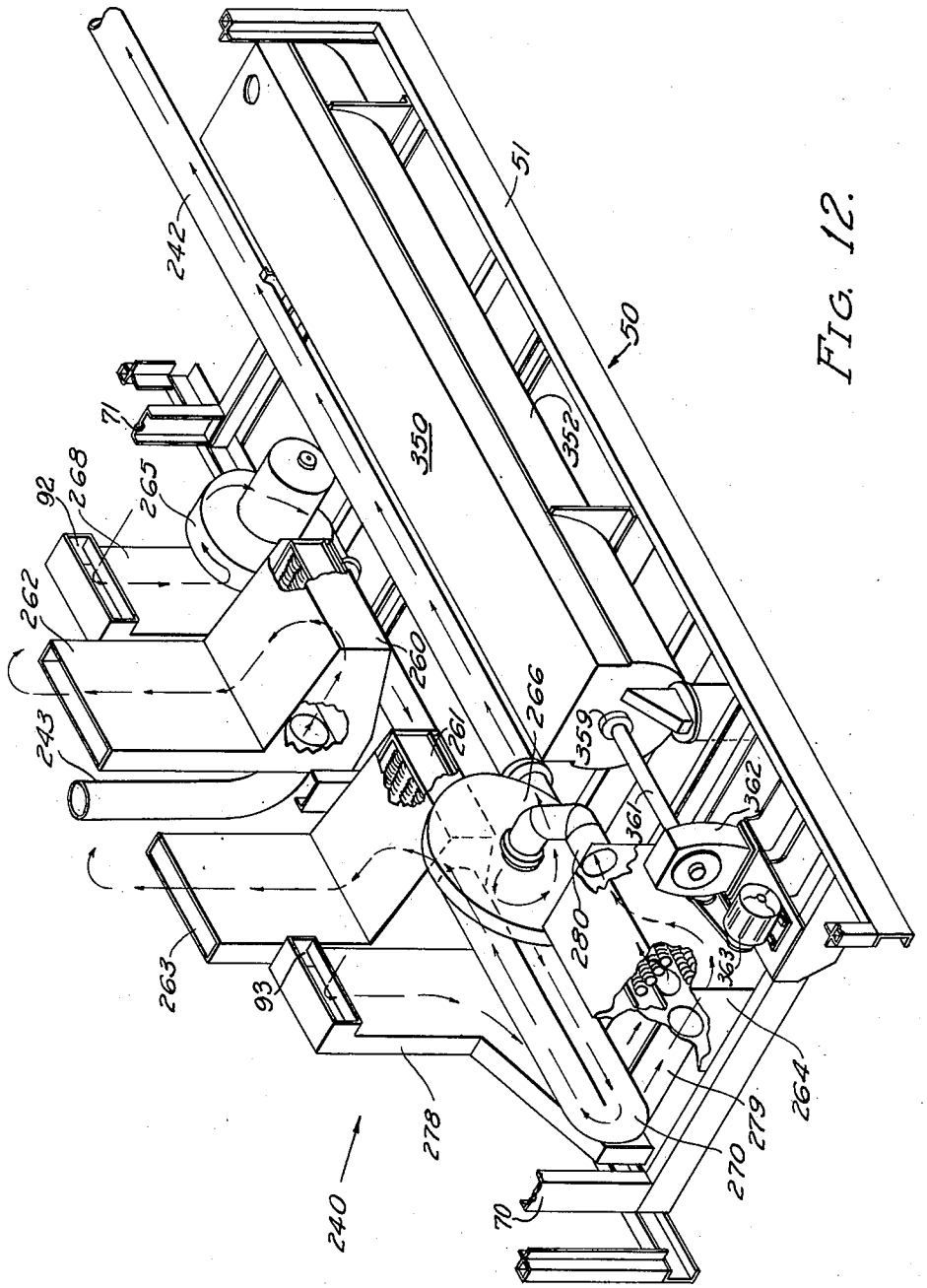

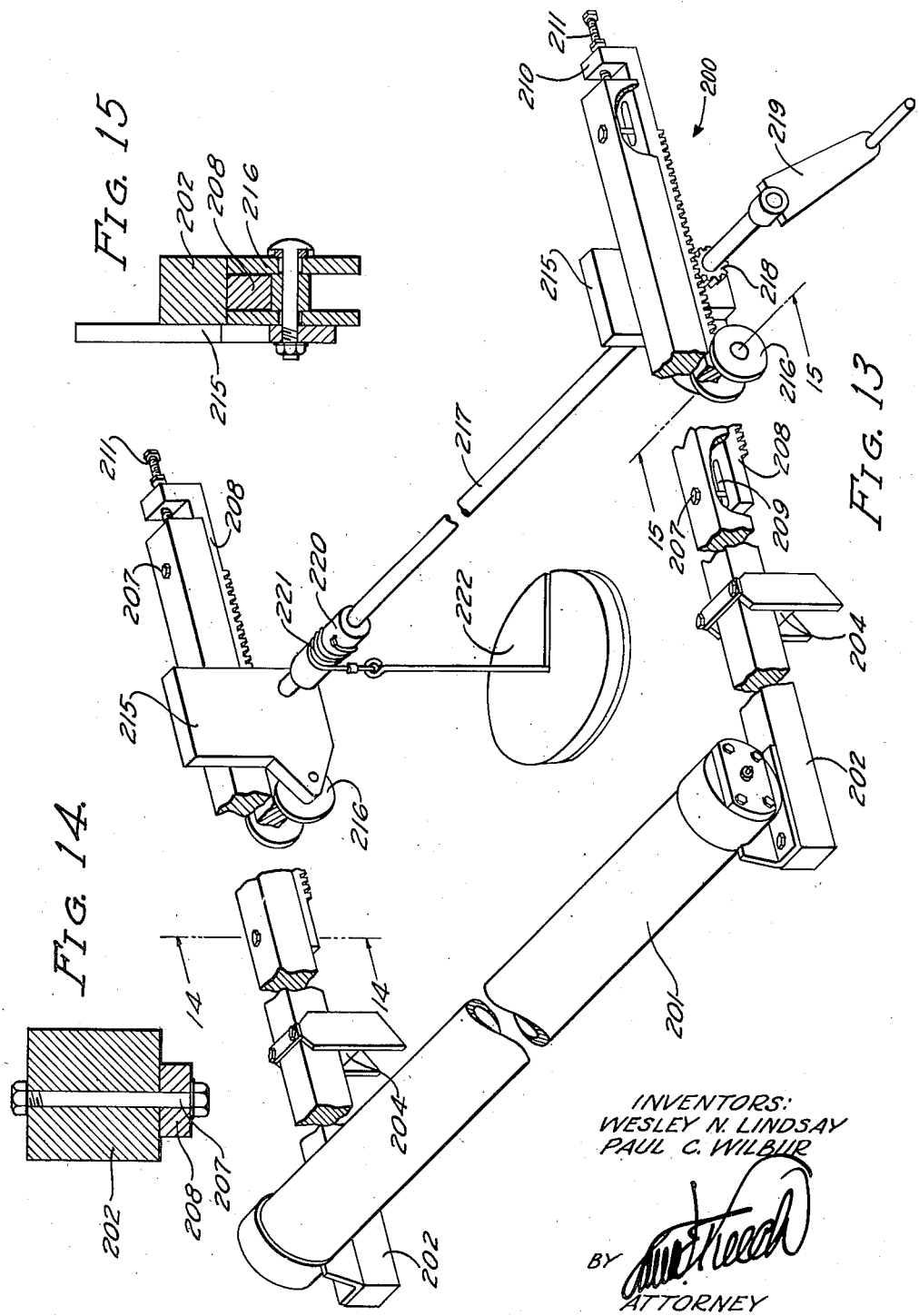

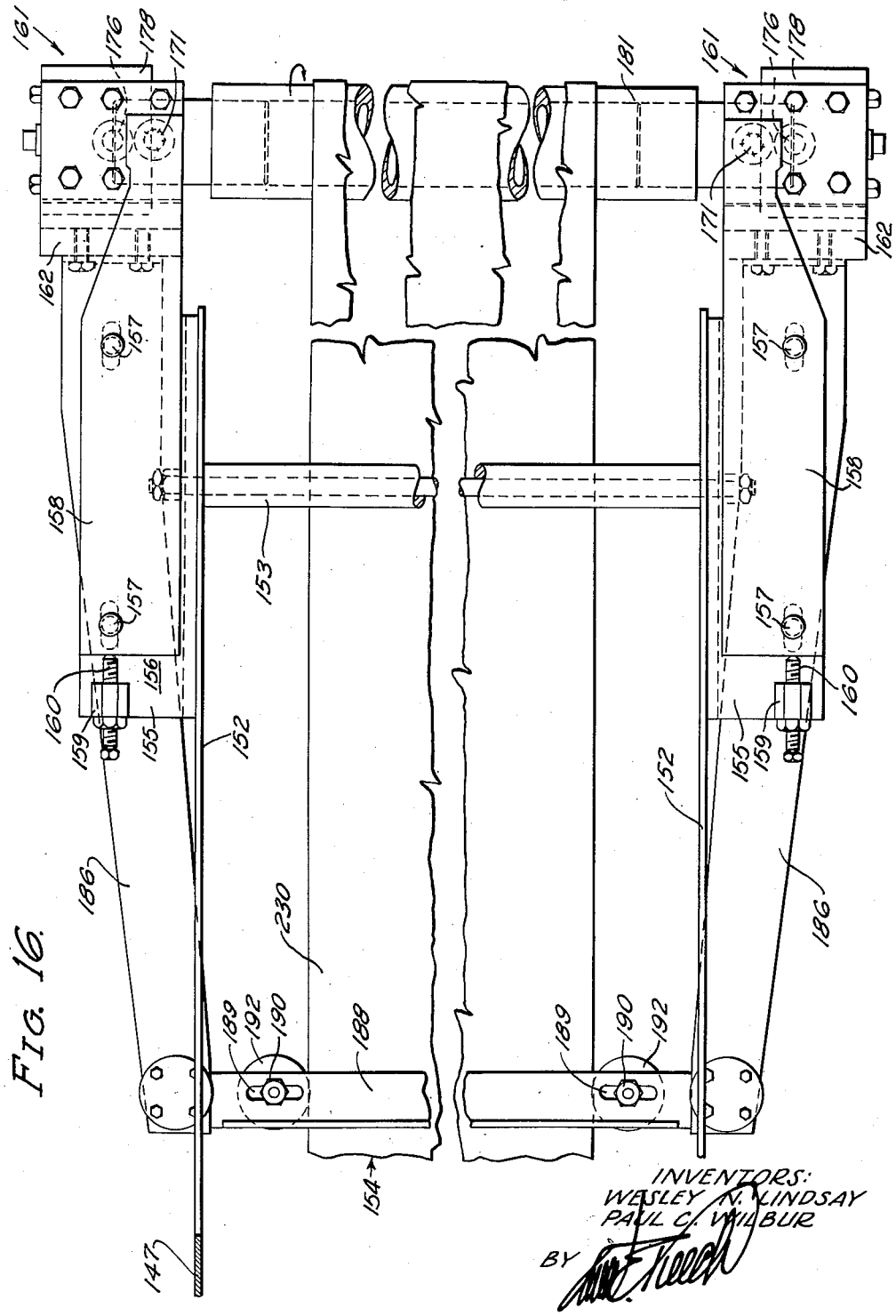

INVENTORS:
WESLEY N. LINDSAY
PAUL C. WILBUR
BY
ATTORNEY

Oct. 16, 1951  W. N. LINDSAY ET AL  2,571,459
METHOD OF AND APPARATUS FOR PRODUCING DRIED WHOLE EGGS
Filed Nov. 5, 1945  13 Sheets-Sheet 13
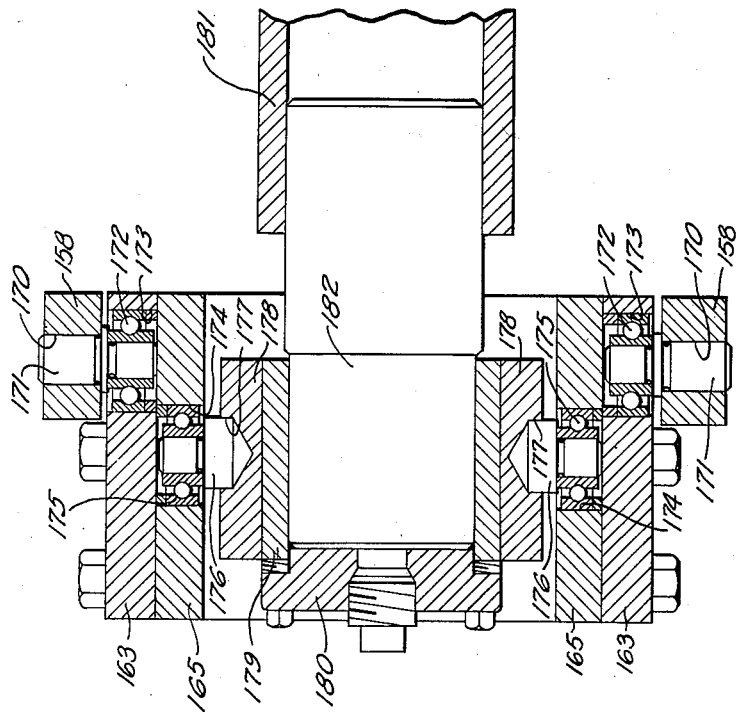
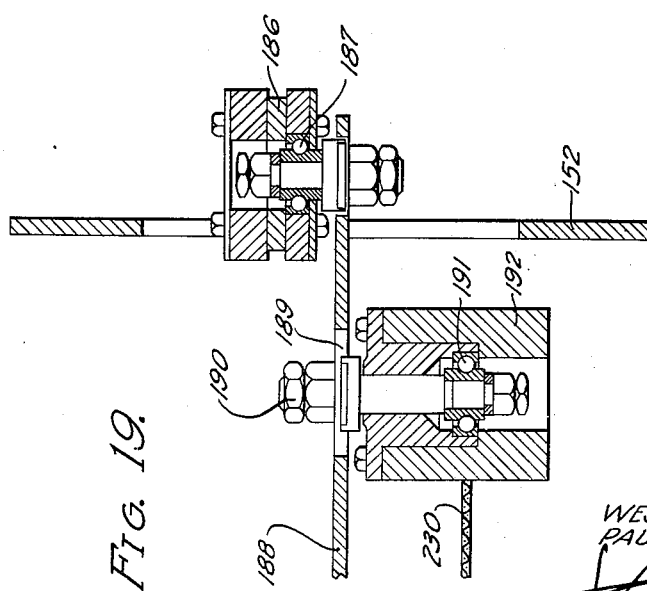
INVENTORS:
WESLEY N. LINDSAY
PAUL C. WILBUR
BY 
ATTORNEY Patented Oct. 16, 1951

2,571,459

UNITED STATES PATENT OFFICE 2,571,459

METHOD OF AND APPARATUS FOR PRODUCING DRIED WHOLE EGGS

Wesley N. Lindsay and Paul C. Wilbur, San Jose, Calif., assignors to Food Machinery and Chemical Corporation, a corporation of Delaware Application November 5, 1945, Serial No. 626,826

8 Claims. (Cl. 159—48)

This invention relates to the art of preparing liquid foods in powder form. Although the invention has wide utility and can be used in reducing various liquid foods to powder form, it is especially adapted for the production of low moisture dried whole egg and for illustrative purposes will be so disclosed herein.

The production of powdered eggs commercially has for long been carried on by first breaking the eggs, separating the shell from the meat and after mixing the whites and yolks to produce liquid whole egg meat, spraying this into stream of hot air discharged into a large chamber. The particles into which the egg is divided by the spraying action are dried solid by the air, after which they fall into the bottom of the spray chamber in the form of powder or collect on fabric bags through which the air escapes. This is known as the "spray method," and prior to the development of the present invention, produced practically all of the powdered egg sold commercially.

This product is customarily packed in cans, cartons or barrels without being sealed from the atmosphere. Prior to this invention, the greatest demand for powdered eggs came from bakeries.

Powdered eggs may be reconstituted as liquid whole eggs by the addition of water and cooked much the same as fresh eggs in the form of scrambled eggs or omelets and the like and have a similar appearance to fresh eggs when thus cooked. However, powdered eggs as produced by the spray method are unstable and tend to develop an odor which appears in the cooked eggs and renders these offensive to the taste. This offensive odor has been found likely to develop in powdered egg where the packages containing this are kept more than a few months before using or where these are subjected to high atmospheric temperatures as in tropical climate.

As the result of this tendency of powdered egg as hitherto produced commercially to deteriorate, it has not been practicable to rely upon it for use in cooking various dishes such as scrambled eggs and omelets and the possible market for eggs in powdered form has thus been greatly limited.

It is an object of this invention to provide a method of and apparatus for manufacturing dried whole egg, the keeping qualities and continued palatability of which may be relied upon so as to greatly increase the opportunities for sale and consumption of this product.

There are several factors determining the stability of egg powder. The most important of these is the moisture content of the powder which is ordinarily measured in percent by weight of water. Another factor is the temperature at which the powder is stored. Still another is the presence in the egg powder of bacterial enzymes derived from bacterial activity in the original liquid eggs. The opportunity for the latter two factors to bring about a deterioration in the quality of egg powder is lacking, however, in proportion to the degree to which the moisture content of the powder is reduced.

It is accordingly an important object of this invention to provide a method of and apparatus for manufacturing dried whole egg powder with a relatively low moisture content.

Reconstituted liquid whole egg approaches fresh liquid whole egg in quality in proportion as the egg powder from which it is made is soluble in water and is free from elements offensive to the senses of taste and smell. Thus egg powder is not only tested for moisture content to determine its stability in resisting deterioration, but it is also tested for solubility, and for fluorescence, the latter being an index of elements in the powder which tend to impair its palatability.

In producing egg powder from liquid whole egg, the palatability and solubility of the latter may easily be impaired by heat damage incurred in the drying process. Attempts to reduce the moisture content of egg powder to a low point by previous methods have resulted in serious decreases in solubility and increases in fluorescence values.

It is a further object of this invention to provide a method of and apparatus for producing an egg powder of low moisture content, or high solubility, and with a low fluorescence value.

Previous efforts to produce a whole egg powder with relatively low moisture content have been mainly along the lines of increasing the temperature of the air in the spray drier, or of resuspending the powder particles in a stream of dry hot air. These methods have had only a relatively small measure of success due to the fact that the egg powder would become scorched and its palatability impaired whenever temperatures and time periods were employed which were necessary to attain the desired low moisture content.

It appeared to us that this scorching takes place when the egg particles are heated to approximately the temperature of the drying air while these particles are still relatively moist. We conceived, therefore that the desired low moisture content could be attained in whole egg powder if the particles thereof could be subjected to dry air of the required high temperature for the necessary time period without permitting the temperature of these particles to be raised to approximately the temperature of the air, and to prevent this particularly, while the particles are still relatively moist.

It is a still further object of this invention to provide a method of and apparatus for producing commercially, an egg powder of low moisture content in which air of relatively high temperature may be applied to the whole egg particles without heating these particles to approximately the temperature of said air while said particles are relatively moist.

The method of this invention starts with an initial drying step in which the liquid whole egg meat is reduced, as by the spray method, to a relatively high moisture powder. The balance of the method involves further reducing the moisture content of this powder without damaging it.

Other liquid foods such as milk and pureed soups are also commonly reduced commercially to powder form by the spray method. These powders are organic and hygroscopic and the drying of these present problems similar to those met in producing dried whole egg. It is thus clear that this invention is adaptable to the redrying of various liquid foods capable of reduction to hygroscopic powders although it is particularly useful in producing low moisture dried egg powder having exceptional qualities of palatability and resistance to deterioration.

It is therefore a broad object of this invention to provide a method of and apparatus for redrying hygroscopic, organic powders produced in the first instance by drying liquid foods.

The manner of accomplishing the foregoing objects, as well as further objects and advantages will be made manifest in the following description taken together with the accompanying drawings in which:

Fig. 3 is a diagrammatic enlarged horizontal sectional view taken on the line 3—3 of Fig. 1.

Fig. 4 is a diagrammatic vertical longitudinal sectional view taken on the line 4—4 of Fig. 3.

Fig. 5 is an enlarged side elevational view of the left half of said apparatus with the side panels thereof removed and partially broken away to illustrate hidden portions of the mechanism.

Fig. 8 is a cross-sectional view similar to Fig. 7 and taken on the line 8—8 of Figs. 3 and 5.

Fig. 12 is a diagrammatic perspective view of the cooler and air handling devices of the apparatus of the invention.

Fig. 13 is a fragmentary perspective view of the drying belt tightener of the apparatus.

Fig. 14 is an enlarged cross-sectional view taken on the line 14—14 of Fig. 13.

Fig. 15 is an enlarged sectional view taken on the line 15—15 of Fig. 13.

Fig. 16 is a diagrammatic fragmentary plan view of the drying belt centralizing mechanism of the invention.

Fig. 18 is an enlarged cross-sectional view taken on the line 18—18 of Fig. 17.

Fig. 19 is an enlarged cross-sectional view taken on the line 19—19 of Fig. 17.

Figure 1:
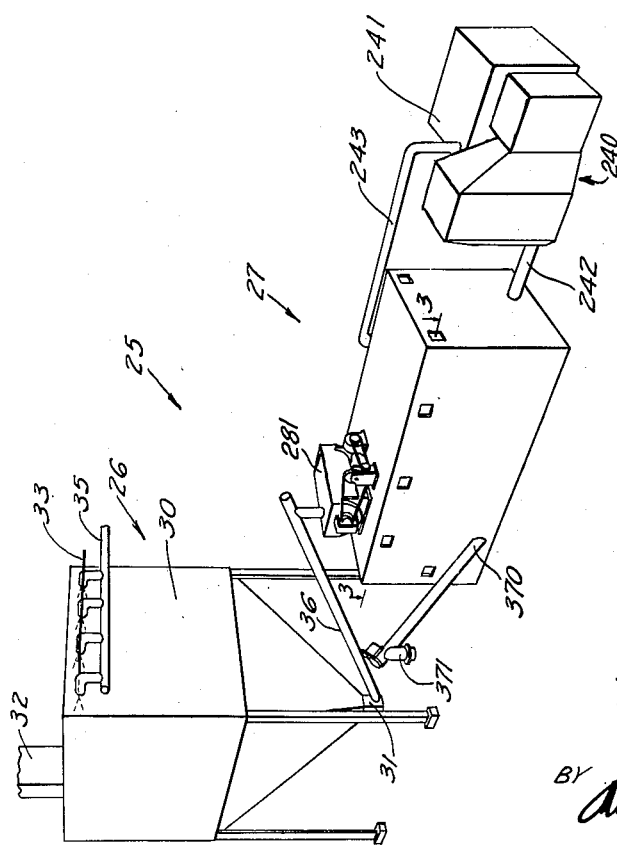
Fig. 1 is a diagrammatic perspective view of a preferred embodiment of the apparatus of the invention.

Referring specifically to the drawings and particularly to Fig. 1, the apparatus shown therein may be designated generally by the numeral 25. This includes a liquid egg spray drier 26 and an egg powder drier 27.

Being of a well known type in common use prior to this invention, the spray drier 26 will not be disclosed herein in detail. It comprises a cyclone-like shell 30 in the shape of an inverted pyramid. At its lower end this terminates in a sump 31. Opening upwardly from the shell 30 is an air outlet 32.

A spray manifold 33 leads to suitable nozzles (not shown) which are located inside the shell 30. Liquid egg is supplied under pressure to the manifold 33 and discharged from said nozzles into the interior of the shell 30 in the form of fine spray. A hot air manifold 35 delivers hot air into the interior of the shell 30 in blasts which are concentric with said nozzles. This air is delivered at a temperature of about 200–235° F. and in sufficient volume to evaporate the moisture from the liquid egg particles delivered from the spray nozzles so that these gravitate into the sump 31 of the drier 26 in the form of a powder. Extending into the sump 31 for removing powder therefrom as this accumulates is a screw conveyor elevator 36.

The powder drier 27 has a frame 50 including a base 51 (Fig. 6) formed of structural steel and a rectangular super structure 52 of the same material. This super structure supports bottom side panels 53 (Fig. 8) which are preferably formed of only a single thickness of sheet metal, upper side panels 54 which are double walled and filled with insulating material, similar insulating end panels 55 and 56 (Figs. 4, 5 and 6), a similar but thicker insulating top wall 58 (Figs. 4, 5, 6, 7 and 8), and a bottom wall 59 of similar insulating construction, portions 60 and 61 of which are joined by a vertical portion 62 (Fig. 4).

The panels 54, 55, 56, and the top wall 58 and bottom wall 59 are thus seen to unite to form an insulated housing 65 enclosing a drying chamber 66 (Figs. 3, 4, 5, 6, 7 and 8).

Mounted on U-shaped channel members 70 and 71 which are embodied in the frame 50 and extend upwardly into the chamber 66, is a continuous powder bank forming and drying mechanism 72 (Fig. 4). This includes a suction box 73, end walls 74 of which are secured to the members 70 and 71 at the back side of the drier. Through this connection, the box 73 and the entire mechanism 72 are supported. The box 73 also has a bottom 75, side walls 76 and 77 (Fig. 8), and a central partition 78 (Fig. 4).

Provided on upper edges of the box side walls 76 and 77 are edge plates 79 which extend inwardly therefrom and have flanges 80 extending downwardly from their inner edges (Fig. 8). Extending inwardly from the upper edges of end walls 74 (Fig. 4) are similar edge plates 81 which unite with the plates 79 to form a frame about a central suction opening 82 in the top of the box 73. Secured to box side walls 76 and 77 (Figs. 4 and 8) and extending across the box are channel members 85 which support apron support channel members 86. Formed in the central partition 78 (Fig. 4) are upper and lower openings 87 and 88 respectively, the purpose of which will be made clear hereinafter. Supported by the partition 78 and the right end wall 74 adjacent opposite ends of opening 88 are apron supporting angle members 89 (Figs. 4 and 8).

The opening 87 (Fig. 4) is formed in the upper edge of the central partition 78 and is provided with a flared horizontal guide plate 90 along its horizontal edge. Similar guide plates 91 are provided along the upper and lower horizontal edges of the opening 88.

Formed in the side wall 77 on one side of the partition 78 is a suction hole 92 while a similar hole 93 is provided in said wall on the opposite side of the partition 78.

Figure 7:
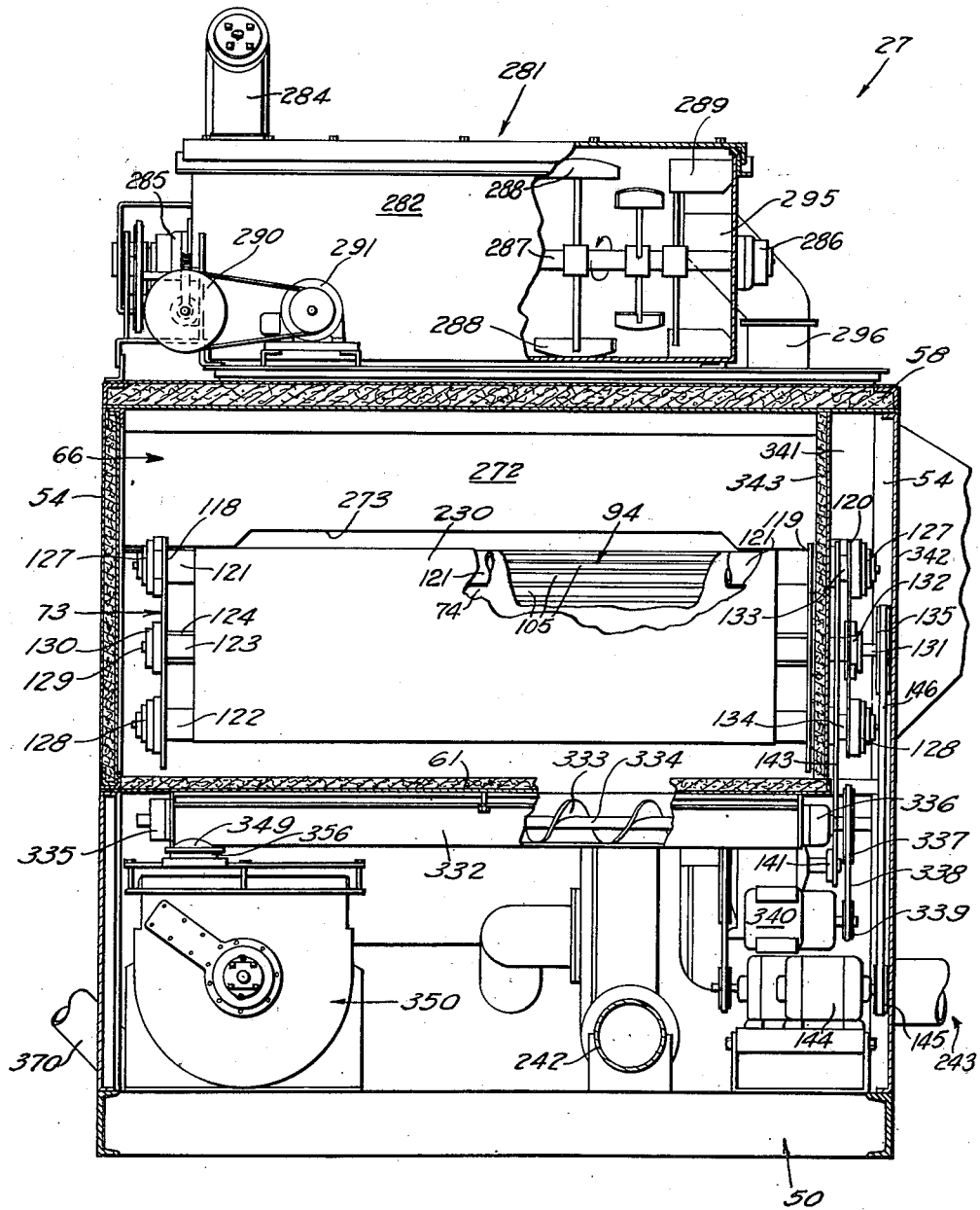
Fig. 7 is a view taken on the line 7—7 of Fig. 6 with parts of the apparatus broken away to reveal the structure of normally hidden portions thereof.
Figure 10:
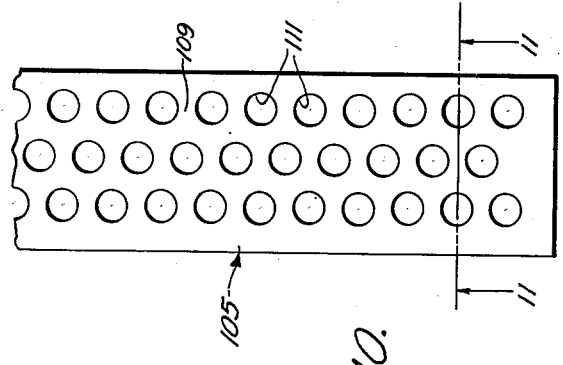
Fig. 10 is an enlarged plan view of an end portion of one of the cross bars of the drying belt supporting apron of the apparatus.
Figure 11:
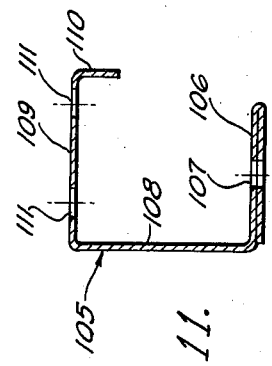
Fig. 11 is a cross-sectional view taken on the line 11—11 of Fig. 10.

Mounted in the box 73 so that the upper flight thereof is level with the edge plates 79 and 81 and substantially fills the central suction opening 82 of this box is a traveling apron 94 (Figs. 4, 7 and 8). This is supported on driven and drive shafts 95 and 96 (Fig. 4) respectively which journal in suitable bearings 97 and 98 which are provided on box side walls 76 and 77. These shafts have spaced pairs of sprockets 99 about which are trained chains 100. These chains are made up of attachment links, to corresponding opposite pairs of which are attached U-shaped sheet metal cross bars 105 (Figs. 4, 8, 10 and 11).

These cross bars are preferably formed of sheet metal re-bent to provide a heavy base 106 having a pair of holes 107 through which bolts may be received to secure the bar to the attachment links of the chain 100. Formed by upwardly bending this metal on one edge of this base 106 is a vertical wall 108. Bent from the upper edge of this is a top wall 109, an edge flange 110 of this being bent down for strengthening purposes. The top wall 109 of the bar 105 is provided with a multiplicity of perforations 111.

Those portions of chains 100 disposed in the upper flight of the apron 94 rest on and are guided by the apron supporting channel members 86 (Figs. 4 and 8). While disposed in this upper flight, the cross bars 105 of said apron are substantially in contact with each other to present a practically continuous perforated surface throughout all portions of the central suction opening 82 of the suction box 73.

The openings 88 and 87 and the guide plates 90 and 91 bordering these are shaped to conform closely to the upper and lower flights of the endless apron 94 as these pass through these openings. Thus the partition 78 makes a fairly tight wall dividing opposite end portions of the suction box 73 so that this box includes a primary suction chamber 116 and a secondary suction chamber 117 (Fig. 4).

The side walls 76 and 77 have end extensions 118 and 119 just within the housing end 55 (Figs. 3 and 7). Provided on the frame 50 is a bearing support plate 120 which is coextensive with and disposed opposite the wall extension 119 and in spaced relation therewith. Disposed between the wall extensions 118 and 119 (Figs. 4 and 7) are upper and lower drier belt drive pulleys 121 and 122 and a beater roller 123, beater flanges 124 being provided on the latter. The pulleys 121 and 122 have suitable trunnions 125 and 126 (Fig. 2) which journal respectively in bearings 127 and 128 (Figs. 6 and 7) which are provided on the wall extension 118 and on the plate 120. The roller 123 has a trunnion 129 which journals in a bearing 130 provided on the wall extension 118 and a trunnion 131 which journals in a bearing 132 provided on the bearing plate 120. Pulleys 121 and 122 have sprockets 133 and 134 (Fig. 2) and the roller 123 has a pulley 135.

Figure 2:
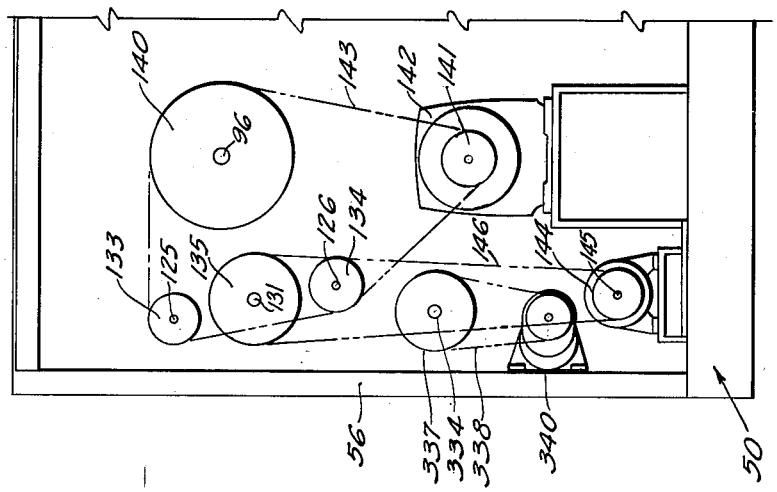
Fig. 2 is a diagrammatic elevational view of the drive mechanism of said apparatus.

Referring to Figs. 2, 3 and 7, it will be noted that the drive shaft 96 of the endless apron 94 has a large diameter sprocket 140 which lies in the same plane as the sprockets 133 and 134 and with the drive sprocket 141 of a geared electric motor 142, these sprockets all being connected by a drive chain 143 trained thereabout.

The beater roller 123 is driven by a motor 144 having a pulley 145 which lies in the same plane as pulley 135 and is connected thereto by a drive belt 146.

Formed on the suction box side walls 76 and 77 (Fig. 8) and extending therefrom towards the housing end wall 55 (Fig. 4) is a pair of vertical plates 147, these plates carrying pairs of bearings 148 and 149 (Fig. 5) in which are journaled suitable trunnions provided on opposite ends of idle drier belt pulleys 150 and 151 (Fig. 4). Extending inwardly from lower ends of the vertical plates 147 (Figs. 5, 16 and 17) are arms 152 which are rigidly spaced by a spacer 153.

Mounted on the arms 152 is a drier belt equalizing device 154 (Fig. 16). This device includes angle members 155 which are secured as by welding to outside faces of the arm 152. These angle members have horizontal flanges 156 which are slotted longitudinally to receive cap screws 157 which adjustably secure upper and lower trunnion plates 158 to the members 155. Secured as by welding to the flanges 156 are blocks 159 having set screw 160 which bear against plates 158 and provide adjustable stops for these plates.

Mounted between the spaced ends of the trunnion plates 158 are bearing cradles 161 (Fig. 17), each of which comprise a U-shaped yoke 162 including parallel arms 163 and a connecting back bar 164. Secured to inner faces of the arms 163 are bearing mounting plates 165. Formed in each pair of trunnion plates 158 are vertically aligned holes 170 (Fig. 18) which receive pins 171 on inner ends of which are provided ball bearings 172 which are snugly received in holes 173 provided in the yoke arms 163. Offset outwardly from the axis of the bearings 172 are holes 174 formed in the plates 165. These holes contain bearings 175 which receive pins 176, the latter extending into recesses 177 provided in a pulley bearing 178. This bearing may be provided with a sleeve 179 and have its outer end covered by a cap 180.

Disposed between the bearings 178 of the equalizer 154 is an equalizing drier belt pulley 181 (Fig. 16) having trunnions 182 (Fig. 18) at its opposite ends which journal in these bearings.

Figure 17:
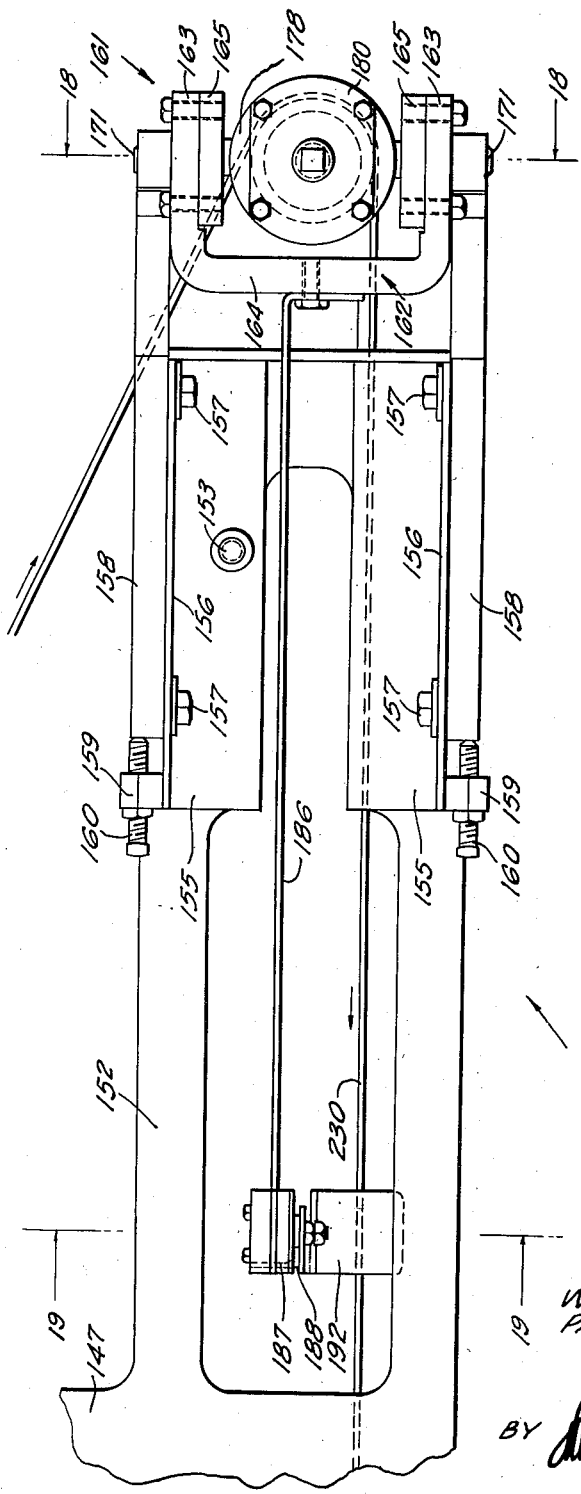
Fig. 17 is a side elevational view of Fig. 16.

Fixed to the back bar 164 of each yoke 162 is a control arm 186 (Figs. 16 and 17).

The outer ends of the arms 186 are pivotally connected by ball bearings 187 (Fig. 17) to opposite ends of an angle cross arm 188 (Fig. 16). The arms 186 are thus tied together, yet permitted a limited degree of swinging movement about the pins 171. Each of the bearing yokes 161 partakes of this swinging movement of the arm 186 to which it is rigidly secured.

Adjustably secured in slots 189 provided in the cross arm 188 are pin bolts 190 (Figs. 16 and 19) on the lower ends of which are provided ball bearings 191 on which rollers 192 are rotatably supported.

Mounted on the housing lower wall 59 is a drier belt tightener 200 (Figs. 4, 5, 6 and 13). This comprises a tightener pulley 201, opposite ends of which are pivotally mounted on corresponding ends of a pair of horizontal bars 202 which extend through holes 203 (Fig. 4) in the vertical portion 62 of the bottom wall 59 of the housing so that the pulley 201 is within the drying chamber 66. Mounted on the vertical wall portion 62 are rollers 204 which support the bars 202 so that they readily slide in the openings 203. Secured to the bars 202 by bolts 207 are racks 208, the bolts 207 extending through slots 209 in these racks to provide for longitudinal adjustment of the latter on the bars 202. The racks 208 extend beyond the outer ends of the bars 202 and have screw blocks 210 in which adjustment screws 211 are provided to bear against adjacent ends of the bars 202 to effect small adjustments in the longitudinal relationships of the racks 208 and the bars 202. The bolts 207 are of course loosened to permit such adjustments and are thereafter tightened.

Mounted on the horizontal bottom housing wall portion 61 (Figs. 4 and 5) just inside of the bars 202 are bearing plates 215. These carry flanged rollers 216 on which the racks 208 ride and also provide bearings for a shaft 217 having fixed thereon pinion gears 218 which mesh with the racks 208. Fixed on the front end of the shaft 217 is a handle 219. Also fixed to the shaft between the plates 215 is a sleeve drum 220 on which a cable 221 is coiled, the free end of this having a weight 222 suspended thereon. This weight tends to rotate the shaft 217 to extend the bars 202 inwardly through the openings 203.

Figure 6:
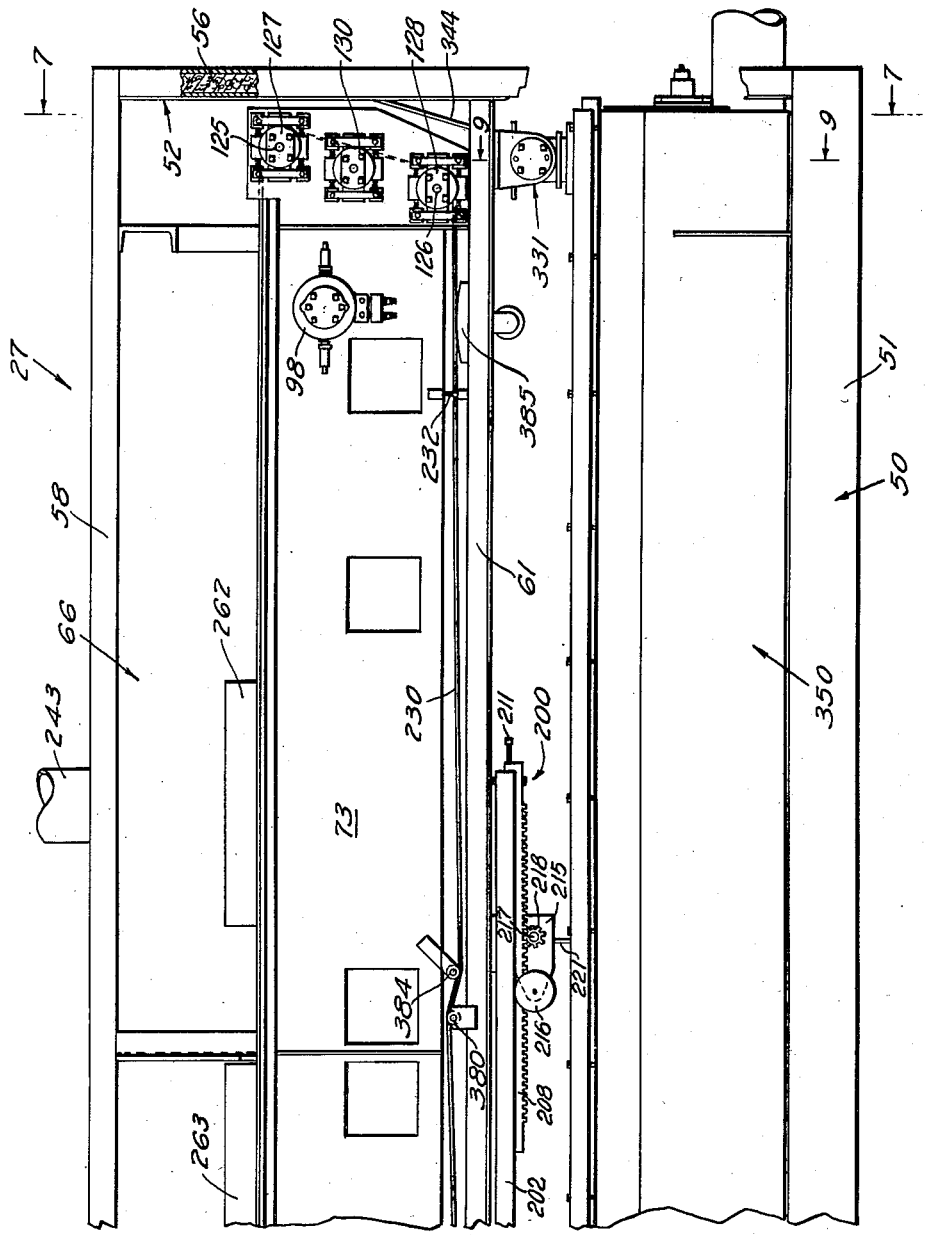
Fig. 6 is a corresponding side elevational view of the right half of said apparatus.

The structure described hereinabove is so made that an endless canvas drier belt 230 (Fig. 4) may be inserted into place so as to surround the suction box 73 and be trained about the pulleys 121, 122, 201, 181, 151, and 150 as shown in Figs. 3 and 4. To accomplish this, the front side panels 54 (those disposed toward the left in Figs. 7 and 8) are removed so that the powder drier 27 appears as shown in Figs. 5 and 6. Before the belt 230 may be thus inserted, jacks 231 and 232 which are provided between the lower edge of the suction box side wall 76 and the housing bottom wall portion 61 are removed temporarily.

When first inserting the belt 230, tightener pulley 201 is shifted as far as it will go to the right (as viewed in Fig. 4) by manual rotation of the shaft 217. When the belt 230 has thus been inserted and properly centralized in the machine, the handle 217 is released permitting the weight 222 to shift the pulley 201 against the belt 230 and thus tighten this. The desired degree of tightness is thus maintained in the belt in accordance with the size of the weight 222 which is applied to the cable 221 (Fig. 13).

As may be noted from Figs. 3, 4, and 8, the upper flight of the belt 230 overlies the suction box 73 and covers the suction opening 82 and the upper flight of the apron 94 which is disposed in this opening. The belt 230 is also wide enough to overlap the marginal top plates 79 about 6 inches on each side of the suction opening 82.

The belt centralizer 154 (Fig. 17') serves to keep the belt 230 centralized with respect to the pulleys about which it is entrained and thus prevent it straying more than a slight amount away from its centralized position in the machine. This correction is effected by the positioning of the rollers 192 (Fig. 16) in contact with opposite side edges of the belt 230. Thus when the belt starts to stray to one side or the other, it shifts one of these rollers which swings the arms 186 and the bearing cradles 161 in the same direction about their respective pins 171. Any such movement shifts the bearings 178, in which opposite ends of the pulley 181 journal, horizontally in opposite directions, thus cocking the pulley 181 a slight amount and in the proper direction to cause the belt to shift back towards the center from the side towards which it had strayed. By means of adjustment of the roller supporting bolts 190 in the slots 189 (Fig. 16) the belt centralizer 154 may be caused to maintain the belt centralized regardless of occasional unequal stretching of opposite edge portions of the belt.

Associated with and adapted to supply dry, hot air, or any other suitable gas, to the powderbank forming and drying mechanism 72 (Fig. 4) is the air drying and circulating mechanism 240 (Figs. 1 and 12). Embraced in this mechanism is a silica-gel air drier 241 (Fig. 1) having an inlet pipe 242 and an outlet pipe 243. This drier may be of any suitable type, and a Bryant rotary dehumidifier, model 29-R, made by the Bryant Heater Company of Cleveland, Ohio has been found to satisfactorily perform the function of the air drier 241. The Bryant rotary dehumidifier is thoroughly illustrated and described in a catalogue published by the Bryant Company in April 1943, and includes one or more rotary double walled screen-drums, the space between the two screens being packed with silica-gel. Each such rotating drum is confined within a housing which is divided, by partitions extending longitudinally of and disposed within and outside of said drum, into two chambers—a reactivating chamber and an air drying chamber. In the first chamber, the silica-gel is heated to reactivate the same and in the second chamber, wet air is passed through the silica-gel to remove the moisture from the air.

The mechanism 240 also includes primary and secondary air heaters 260 and 261 having air discharge risers 262 and 263; an air cooler 264; and primary and secondary air blowers 265 and 266.

As shown in Fig. 12, the heaters 260 and 261, the cooler 264, and the blowers 265 and 266 are mounted on the base 51 of the powder drier frame 50. The dry air discharge pipe 243 of the air redrier 241 connects with and discharges into the heater 260, the air being heated in this and discharged upwardly into the drying chamber 66 from the riser 262 (Figs. 3 and 4). Secured to the upper edge of the wall 77 (Figs. 3 and 8) and surrounding the riser 262 so as to close off the space between the wall 77 and the adjacent housing side partitions 54 is a horizontal plate 267.

Connecting with the air suction opening 92 of the suction box 73 (Fig. 4) is a narrow suction conduit 268 (Fig. 12) which connects with the suction end of the blower 265.

Leading from the discharge end of this blower to the heater 261 is a pipe 270. This pipe extends beyond the heater 261 and then returns to the latter to provide a sufficiently long, straight section in this pipe in which to place a flow meter (not shown).

The air thus delivered to the heater 261 is heated therein and then discharged upwardly from the riser 263 into the drying chamber 66 (Figs. 3, 4, 5 and 8). Secured to the upper edge of the suction box side wall 77 and extending horizontally therefrom to close the space which surrounds the riser 263 between this wall and the housing side wall 54 is a plate 271 (Fig. 3).

Mounted in the space between the housing top wall 58 and the drier belt 230 to substantially prevent mixing of air discharged upwardly from the risers 262 and 263 is a central baffle wall 272 (Fig. 4) which has a long narrow recess 273 at its lower edge to accommodate the passage therethrough of a bank of powdered egg carried on the drying belt 230.

Connecting with the suction opening 93 in the suction chamber 116 (Figs. 4, 8 and 12) is a relatively flat conduit 278 which is connected to the cooler 264 by a pipe 279. This cooler cools air passing therethrough which is sucked therefrom by a pipe 280 connecting the cooler to the suction end of the blower 266. This air is then delivered from the discharge end of the blower 266 to the pipe 242 through which it is returned to the air redrier 241.

Egg powder produced in the spray drier 26 (Fig. 1) is received from the conveyor 36 and delivered onto the drier belt 230 of the powder drier 27 by a powder feeder 281 (Figs. 1, 4, 5 and 7). This feeder is mounted on the drier top wall 58 and includes a mixing trough 282 which is closed by a cover 283 having an inlet pipe 284 through which powder is delivered from the conveyor 36 into one end of the trough 282. Journalled in suitable bearings 285 and 286 (Fig. 8) provided on opposite ends of the trough 282 is a shaft 287 which carries helically inclined paddles 288 at spaced intervals throughout its length, and scoop paddles 289 at the opposite end of the shaft from the inlet pipe 284. The shaft 287 is rotated slowly through a suitable transmission 290 by a motor 291 so that the paddles 288 cause the powder delivered through the pipe 284 to progress towards the opposite end of the trough 282 until, after being thus thoroughly mixed, it is delivered to the scoop paddles 289.

Extending into the trough 282 within the sweep of the scoop paddles 289 (Fig. 7) is a powder receiving hopper 295 which connects with a pipe 296, the latter extending downwardly through the housing top wall 58 (Figs. 4 and 8). A guide wall 297 (Fig. 4) guides into the hopper 295, powder lifted by the scoop paddles 289.

Mounted on the frame 50 between the upper flight of the powder drying belt 230 and the top wall 58 just beneath the feeder 281 is a powder spreader 305 (Figs. 3, 4, 5 and 8) which is preferably of the Jeffrey-Traylor vibrating type. This spreader has a vibration producing unit 306 (Fig. 8) similar to that illustrated in U. S. Letters Patent to E. V. Francis, No. 2,161,342, issued June 6, 1939. This unit has an armature 307 which is provided with a long, tapered, spreader deck 308, the broad end of which is located directly beneath the lower end of the pipe 296 and is surrounded on three sides by a low wall 309 (Figs. 3 and 8). Fixed on the top housing wall 58 is an arm 310 (Fig. 8) which extends beneath and resiliently supports the deck 308 through a coiled spring 311.

Disposed below the deck 308, and rigidly secured thereto, is a powder sifter 315 (Figs. 5 and 8). This powder sifter is disposed horizontally about two and one-half (2½) inches above the powder drying belt 230. This powder sifter includes a screen 316 (Fig. 3) which is preferably made of fourteen (14) gauge stainless steel wire with a mesh approximately five-eighths (⅝) inch square. The screen 316 is preferably about nine inches wider than the spreader deck 308 throughout the length of the latter so that this screen 316 projects four and one-half (4½) inches laterally beyond each of the converging edges of the deck 308.

Lying just beneath edge portions of the screen 316, and secured thereto as by brazing, is a trapezoidal shaped, reinforcing member 317 (Fig. 8) which is preferably made of ⅛ x ¾ angle iron. This is bolted to the base of the deck 308, and adjacent its opposite end is connected to the deck by straps 320 (Figs. 3, 5 and 8). The upper surface of the deck 308 is preferably disposed approximately sixteen (16) inches above the surface of the screen 316 and the lowermost portions of the sifter 316 lie, as stated, approximately two and one-half (2½) inches above the upper surface of the powder drying belt 230.

It is to be understood of course that the precise measurements given are illustrative only and merely represent those employed in a preferred embodiment of the apparatus of the invention.

The lower end of the powder pipe 296 (Figs. 4 and 8) preferably extends downwardly within the space enclosed by the three-sided wall 309 and to a level just below the upper edge of this wall. Thus, powder is delivered from the pipe 296 to the spreader 305 and distributed in a manner to be pointed out hereinafter across the powder drier belt 230. It is to be noted here, however, that a body of powder 325 (Fig. 4) normally builds up and is maintained in the lower end of the pipe 296 which effects a substantially air-tight seal between the drier chamber 66 and the interior of the feeder 281.

Mounted in a transverse opening 330 (Figs. 4, 7 and 9) in the housing bottom wall portion 61 is a screw conveyor 331 which includes a trough 332 and a screw 333, the latter being formed on a shaft 334, opposite ends of which journal in bearings 335 and 336. Provided on an extending end of the shaft 334 is a sprocket 337 which is connected by a chain 338 to the drive pinion sprocket 339 of a geared motor 340.

Having completed the description of the drive mechanism for driving the shafts 96, 125, 126, and 334 as well as the beater 123 (Figs. 2 and 4), it is to be noted that this drive mechanism is excluded from the drying chamber 66 (Figs. 3 and 7). This is done by omitting the rear upper side panel 54 opposite this mechanism and forming a compartment 341 for containing this mechanism by substituting a sheet metal panel 342 (Figs. 3 and 7) for the omitted insulating panel 54, and providing an inwardly extending insulating wall 343 which completely separates the driving mechanism compartment 341 from the chamber 66.

Mounted in the lower right hand corner of the drying chamber 66 so as to deflect powder delivered thereagainst into the screw conveyor trough 332 is a deflector 344 (Figs. 3 and 6). The screw conveyor operates to convey powder dropping therein towards the left hand end thereof as viewed in Figs. 7 and 9. At this end of the conveyor, the trough 332 is provided with a discharge mouth 349 (Fig. 7).

Figure 9:
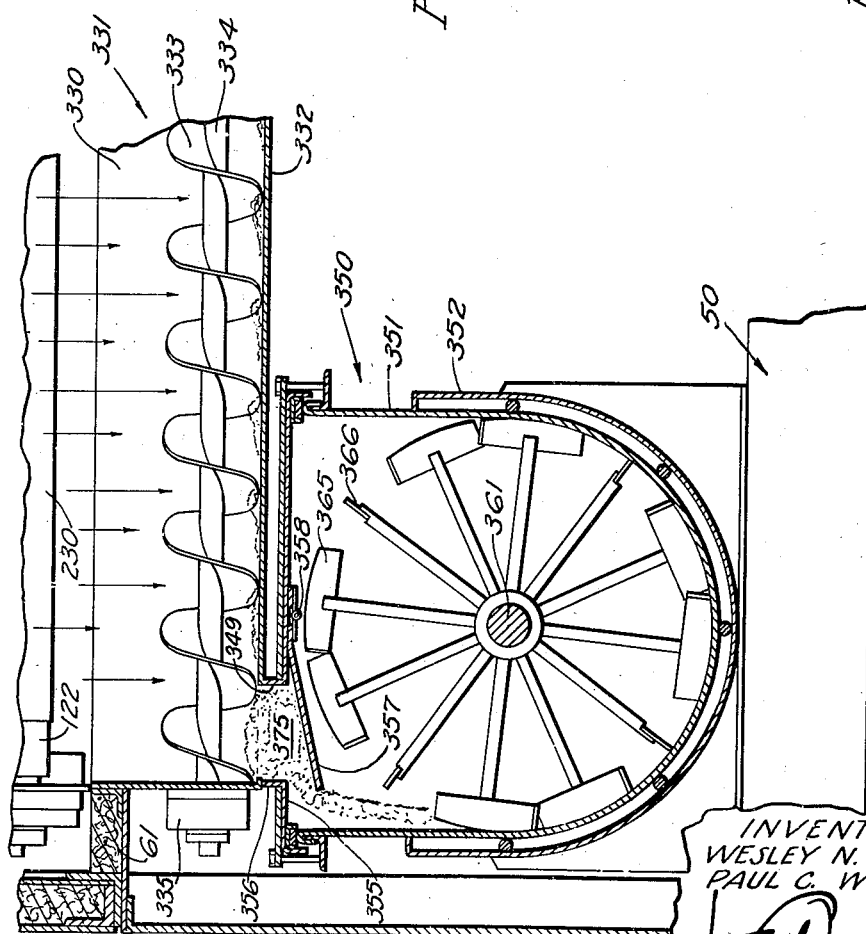
Fig. 9 is an enlarged fragmentary cross-sectional view taken on the line 9—9 of Fig. 6 and illustrating the powder valve through which powder is introduced from the drying chamber of the apparatus into the powder cooler.

Supported on the base 51 of the drier frame 50 is a powder cooler 350. This cooler has a long powder mixing and cooling trough 351 (Fig. 9) which is provided with a water jacket 352 and has end walls 353 and 354 (Fig. 4). The trough 351 also has a cover 355 in which a powder inlet neck 356 is provided which connects with the conveyor discharge mouth 349. Thus, powder delivered by the conveyor 331 to its discharge mouth 349 passes downwardly through the cooler neck 356 into the right hand end of the trough 351 as this is viewed in Figs. 4 and 6. Hingedly mounted on the bottom of the cover 355 as shown in Fig. 9 is a powder valve 357 which is yieldably held upwardly by a spring 358.

Provided in the cooler end walls 353 and 354 are bearings 359 and 360 in which a heavy shaft 361 journals. This shaft is adapted to be slowly rotated by power delivered thereto through a suitable transmission 362 by a motor 363. The shaft 361 has fixed thereon powder advancing paddles 365 which, when the shaft 361 is rotated as indicated in Fig. 4, tends to advance powder delivered into the right hand end of the cooler 350 toward the left hand end thereof. At the latter end of the cooler, the shaft 361 has scoop paddles 366 and a hopper 367 (Figs. 4 and 5) which extends through the wall 353 into the space about which the paddles 366 sweep. A guide wall 368 (Fig. 8) is also provided in said space to cause powder lifted by the scoop paddles 366 to be delivered into the hopper 367. Powder thus delivered gravitates into the lower receiving end of a screw conveyor 370 with which an airtight connection is made and which is adapted to elevate this powder and discharge it downwardly through a pipe 371 (Fig. 1) to a line of machines for packing the powder in cans under a vacuum.

The valve 357 (Fig. 9) yieldably holds upwardly and maintains in the neck 356 a mass of powder 375 so that this neck is always closed by this mass of powder against the passage of hot air downwardly from the chamber 66 through the neck 356 into the cooler 350.

The lower flight of the drier belt 230 is shown in Fig. 4 as unsupported in between the pulleys 122 and 201. It may be preferable however to support this flight of belt 230 as by a small diameter roller 380 (Fig. 5) rotatably mounted on the bottom housing wall portion 61. A similar roller 384 mounted on the suction box 73 holds the belt 230 downward against the roller 380 and out of contact with the box 73.

It is important that the belt 230 be kept as clean as possible. This belt tends to become impregnated with egg powder and for this reason, it is constantly cleaned by a vacuum cleaner 385 mounted in the lower housing wall section 61 and which runs continuously while the apparatus 27 is operating. If desired a rotary beater or brush may be associated with the vacuum cleaner 385 to remove adhering powder particles from the belt while the latter is subjected to the vacuum of the cleaner.

Operation

The spray drier 26 and powder drier 27 are first prepared for operation by warming up certain parts of the apparatus and cooling others until the proper temperatures exist throughout. This takes about twenty minutes.

From the start of this preparation of the powder drier 27, the motors 340, 142, and 144 (Fig. 2) and the motor 291 (Fig. 7) are running; the motor 363 and blowers 265 and 266 (Fig. 12) are running; the heaters 260 and 261 and the cooler 264 are functioning; and the dehumidifier 241 (Fig. 1) is operating to dehumidify air passing therethrough.

The spreader 305 is not energized however until egg powder starts to be fed thereto by the feeder 281. The egg powder masses 325 (Fig. 4) and 375 (Fig. 9) are thus maintained at the inlet and outlet powder passages of the housing 65, thereby closing these to the passage of air into or from the chamber 66 except through the air handling mechanism 240.

Before production of egg powder is started in the spray drier 26, the dew-point of the air circulated by the air system 240 is preferably below —20° F. and the temperature of this air where it leaves the risers 262 and 263 is preferably close to 220° F.

The cooler 264 is functioning to cool the air passing therethrough to a temperature of approximately 80° F.

Cooling water is supplied to the jacket 352 (Fig. 9) of the powder cooler 350 to reduce the temperature of the latter to approximately 60° F.

These values are preferred for starting but the apparatus 27 is able to maintain them throughout the running of powder.

The belt 230 is driven at one foot per minute and as the suction opening 82 is preferably five feet wide by fifteen feet long, powder delivered onto the belt by the spreader 305 (Fig. 3) is subjected to this suction opening for fifteen minutes.

The spreader deck 308 is coextensive in length with the width of the suction opening 82 so that a bank B (Figs. 3, 4 and 8) of powder is generated on the belt 230 by the spreader which just overlaps the side edges of the opening 82 (Fig. 8).

The egg powder produced in the spray drier 26 has a moisture content of approximately 5% when delivered to the redrier 27 (Fig. 4). The redrier is adapted to handle the output of this powder from the spray drier which varies from 500 lbs. to 750 lbs. per hour. When the drier 27 is handling powder at a rate within this range, the bank B of this powder is from one and one-half to two and one-quarter inches deep.

About sixteen minutes after the delivery of powder to the spreader 305 starts, the bank B extends to the discharge end of the upper flight of the belt 230 (Fig. 4) where the powder starts dropping into the screw conveyor 331 and is delivered thereby into the cooler 350.

The mixing and conveying shaft 361 and paddles 365 in the cooler cause the powder to progress through and be delivered from the cooler in about fifteen minutes from the time it enters.

The powder in the bank B is dried as it moves over the suction opening 82, by the hot air, entering chamber 66 through the risers 262 and 263 being sucked downward through the powder bank B, the belt 230, and the apron 94 by the suction imposed upon the suction chambers 116 and 117 by the blowers 266 and 265 respectively. As noted, the egg powder in bank B is preferably subjected to this hot air for fifteen minutes.

A feature of the invention which contributes largely to the production of egg powder with a hitherto unattainably low moisture content, as well as an unusually low fluorescence value, is the banking of the egg powder, produced by the initial spray drying step, while applying hot air thereto to further reduce the moisture content thereof. When the powder is thus subjected to the hot air, the individual particles of powder are protected by the others surrounding it so that the cooling action produced in the individual particles, by the giving up of moisture therefrom holds the temperature of the powder down, especially while the powder is still relatively moist which is the time when the powder is most susceptible to heat damage.

As the powder in mass form loses moisture, the temperature of the powder of course rises but in the method of this invention, the raising of the temperature of the powder in mass form is delayed with the result that the moisture content of the powder is so low, when the powder eventually does get heated up, that the elevated temperature to which the powder is then subject has no damaging effect on the powder.

The sifting of the powder, as this is spread over the belt 230 in generating the powder bank B, is another feature which contributes to the remarkable results obtained with the invention. Egg powder tends to agglomerate in lumps particularly where the moisture content is high. The sifter 315 vibrates with the armature 307 of the spreader 305 (Fig. 8) and practically every lump of powder which falls downwardly thereon from the spreader deck 308 is struck by the wires of the screen 316 and broken up into very fine particles. In fact, the sifter 315 practically breaks this powder up and delivers it onto the belt 230 in the form of the separate fine particles in which the powder was originally produced in the spray drier 26.

Being sifted just above the belt 230, these fine powder particles produce a very light, fluffy bank B of egg powder which is homogeneous throughout and offers a maximum opportunity for the air to pass therethrough in the drying operation, yet leaves no particle isolated in the air stream whereby it might be damaged by the high temperature of the latter.

Tests in representative commercial operations show that with the drying air at 220° F. and with an initial dew point of less than —20° F. the powder in the top half of the bank B reaches an equilibrium moisture of about .45% after proceeding 9.5 ft. over the suction opening 82; and that an equilibrium moisture of .51% in the bottom half of the bank is reached at 14.5 ft. Drying 5% egg powder with the bank method and using air at said temperature and dew point permits a reduction of the moisture content in fifteen minutes to less than .5% without elevating the temperature of the powder above 185° F. Normally the temperature of the powder at the discharge end of the upper flight of the belt 230 is not over 175° F. During the initial stages of drying the powder in the bank B, the temperature of the powder remains below 130° F. until it has travelled three feet and under 160° F. until it has travelled five feet. From this point on, the temperature in the powder bank gradually rises to the maximum stated although it is to be noted that the moisture content of the upper half of the bank has been observed to reach an equilibrium moisture content of .45% at 9.5 ft.

It is to be noted that the drying is accomplished in two steps, in the first of which the air is used after its having passed through other portions of the powder in the second step. When treated in the first drying step, the powder is relatively moist and the air passed through the powder has a comparatively high humidity by virtue of its already having been used once in the second drying step without having been dried in the meantime.

Double use of the air in a closed drying circuit increases the efficiency of the apparatus 27 and makes possible the attainment of a lower moisture content in the powder treated with a given air heating and dehumidifying capacity.

In order to prevent the heat in the powder causing it to deteriorate it is advisable to cool the powder as quickly as possible to a temperature below 100° F. This cooling must of course be accomplished without allowing the atmosphere to have access to the powder as low moisture egg powder is extremely hygroscopic and will pick up atmospheric moisture quickly. It is for this reason that the cooler 350 is sealed off from the atmosphere and also has powder sealed connections with the drying housing 65 and with the discharge conveyor 370. Thus no moisture is allowed access to the cooler 350. While the powder is in this cooler, it is churned against the inner surfaces of the trough 351 which are kept cool by the water in the jacket 352. Besides thus churning the powder, the paddles 365 cause the latter to progress through the cooler. The powder is of course very thoroughly mixed in the cooler with the result that the powder, as discharged from the cooler and canned, is uniform as to moisture content and other qualities.

As a result of protecting the powder from the heat of the drying air while the latter is removing moisture from the powder and then cooling the powder in a short time to a temperature under 100° F., the fluorescence value of the powder produced by this invention is very low.

Over a month's period of recent operation, the average moisture content was .83% and the average fluorescence value was 17. That this fluorescence value is low can be seen from the fact that a premium of 1¢ per pound was at that time being paid by the Army on all purchases of egg powder, the fluorescence value of which was below 20.

That egg powder having a moisture content of less than 1% was then uncommon may also be seen from the fact that the Army at that time paid a premium of ½¢ per pound for egg powder with a moisture content between 1.75% and 1.5%; 1¢ per pound for egg powder with a moisture content of 1.50% to 1.01%; and 1½¢ per pound for egg powder with a moisture content of 1.00% and under.

For the apparatus 27 to operate efficiently, it is important that the drying belt 230 be kept in a relatively porous condition. The egg powder tends to be drawn into this belt and clog up the pores of the latter. As this belt turns downwardly at the discharge end of the upper flight thereof, most of the powder in the bank B, resting on this portion of the belt, drops therefrom by gravity and the beater 123 knocks practically all of the adhering powder from the belt. A few fine particles of egg powder remain on the belt, however, when it passes around the lower drive pulley 122 and the vacuum cleaner 385 is provided to remove these.

In spite of these provisions for cleaning the belt 230, it eventually gets clogged with egg powder and after about six days use, has to be replaced with a clean belt.

The temperatures and values given hereinabove as preferable are by way of example only and it is to be understood that these may be varied considerably without departing from the spirit of the invention or the scope of the appended claims.

For instance a certain amount of the liquid whole egg is rendered insoluble in producing 5% egg powder by the spray method. The additional step taking place in the redrier 27 does not appreciably increase the insoluble material in the powder.

To produce a low moisture egg powder of greater solubility, the temperature at which the spray drier 26 operates may be reduced, thereby causing the powder coming from this to the more soluble than 5% powder, although it would also have a higher moisture content.

The redrying method of this invention can be depended on to reduce the moisture content of this powder to less than one percent whenever the particles of the powder delivered to the redrier 26 are non-coalescing and non-wetting. When redrying powders containing over 8% moisture certain adjustments in temperatures, dew point, volume handled, or period of treatment might be necessary in order to produce a powder with less than 1% moisture.

The apparatus 27 is designed for using an endless belt 230 which possesses no means for dividing and reconnecting it to facilitate its installation in and removal from the apparatus. This belt may be provided with a slide fastener however which will make the changing of belts a relatively simple matter.

We claim:

1. The method of re-drying a hygroscopic organic finely powdered food which comprises generating a bank of said powdered food in a given treating area by continuously depositing particles of said food substantially uniformly along one edge of said area in a loose condition and moving said bank continuously away from said area and towards said area to cause said bank to be formed with a substantially uniform depth, passing air through said bank in a substantially closed circuit, drying said air to a sub-zero Fahrenheit dew-point, and heating said air to a temperature of over 200° F., whereby the moisture content in said powder is reduced while said bank continues to be formed and travel across said area.

2. The method of re-drying a hygroscopic organic finely powdered food which comprises generating a bank of said powdered food in a given treating area by continuously depositing particles of said food substantially uniformly along one edge of said area in a loose condition and moving said bank continuously away from said edge and towards said area to cause said bank to be formed with a substantially uniform depth, passing air through said bank in a substantially closed circuit, drying said air to a sub-zero Fahrenheit dew-point, heating said air to a temperature of over 200° F., whereby the moisture content in said powder is reduced while said bank continues to be formed and travel across said area, and rapidly cooling said powder immediately following said drying step.

3. A method of re-drying a hygroscopic organic finely powdered food which comprises generating a bank of said powdered food in a given treating area by continuously depositing particles of said food substantially uniformly along one edge of said area in a loose condition, moving said bank continuously away from said edge and towards said area to cause said bank to be formed with a substantially uniform depth, passing hot air through said bank in at least two successive steps performed upon successive sections of said bank, said air travelling in a substantially closed circuit, the air employed in the initial drying step being that which was used in the final drying step and without said air having been dried in between said steps, constantly drying the air in said circuit whereby it enters said bank in said final treatment with a dew-point substantially below zero degrees Fahrenheit, and heating the air in said circuit to maintain the temperature of the air entering said bank in each of said steps substantially over 200° F.

4. The method recited in claim 3 in which the depth of said bank is so correlated with the volume of air passed therethrough in said circuit that the internal temperature of said bank is not elevated above 185° F. while the moisture content of said powder is being reduced to less than 1%.

5. The method of re-drying a hygroscopic organic finely powdered food which comprises forming a bank of said powder in loose condition and substantially uniform in depth over a given treating area, placing said bank of powder within a closed circuit of air with the latter passing downwardly through said bank, drying the air in said circuit to a sub-zero Fahrenheit dew-point, heating the air in said circuit to a temperature of over 200° F. whereby the moisture content in said powder is reduced to a relatively small percentage before the internal temperature thereof has risen substantially above 185° F., delivering said powder into a chamber in which the outside atmosphere is excluded from contact therewith and rapidly cooling said powder in said chamber to a temperature of under 100° F.

6. The method of re-drying a hygroscopic organic finely powdered food which comprises forming a bank of said powder in loose condition and substantially uniform in depth over a given treating area, placing said bank of powder within a closed circuit of air with the latter passing downwardly through said bank, drying the air in said circuit to a dew-point of minus 20° F., heating the air in said circuit to a temperature of substantially 220° F. whereby the moisture content in said powder is reduced to 1% or less before the internal temperature thereof has risen substantially above 185° F., delivering said powder into a chamber in which the outside atmosphere is excluded from contact therewith and rapidly cooling said powder in said chamber to a temperature of under 100° F.

7. The method of reducing a liquid food to a relatively stable low moisture powder with little damage to eating quality, which comprises continuously spraying said liquid food into heated air to convert said food into a powder having a relatively high moisture content, distributing said powder in uniformly loose condition and substantially uniform depth along one edge of a given treating area to generate a bank of said powder, moving successive banks of said powder continuously away from said edge and towards said area to cover said area, passing hot air through said banks throughout said area in a substantially closed circuit and constantly drying said air in order to reduce the moisture content in said powder while said banks continue to be formed and moved across said area, and thoroughly mixing and rapidly cooling said powder immediately following the completion of said drying step.

8. The method of producing a low moisture whole egg powder with relatively high solubility and palatability, which comprises continuously spraying liquid whole egg into heated air to convert said liquid egg into a powder having a relatively high moisture content, distributing said egg powder in uniformly loose condition and substantially uniform depth along one edge of a given treating area to generate a bank of powdered egg, moving successive banks of said powder continuously away from said edge and towards said area to cover said area, passing hot air through said banks throughout said area in a substantially closed circuit and constantly drying said air in order to reduce the moisture content of said powdered egg while said banks continue to be formed and moved across said area, and thoroughly mixing and rapidly cooling said powder immediately following the completion of said drying step.

WESLEY N. LINDSAY.
PAUL C. WILBUR.

REFERENCES CITED

The following references are of record in the file of this patent:

UNITED STATES PATENTS

| Number | Name | Date |
|---|---|---|
| 999,972 | Ekenberg | Aug. 8, 1911 |
| 1,369,411 | Edwards | Feb. 22, 1921 |
| 1,421,283 | Meakin | June 27, 1922 |
| 1,459,211 | Kalisz | June 19, 1923 |
| 1,472,314 | Webster | Oct. 30, 1923 |
| 1,596,213 | Nishina | Aug. 17, 1926 |
| 1,653,390 | Coltman | Dec. 20, 1927 |
| 1,682,596 | Callan | Aug. 28, 1928 |
| 1,703,291 | Buck | Feb. 26, 1929 |
| 1,747,260 | Piron | Feb. 18, 1930 |
| 1,761,016 | Koehring et al. | June 3, 1930 |
| 1,782,054 | Uhl | Nov. 18, 1930 |
| 1,826,701 | Ames | Oct. 13, 1931 |
| 1,947,338 | Furbush | Feb. 13, 1934 |
| 2,085,691 | Brown | June 29, 1937 |
| 2,088,606 | Peebles et al. | Aug. 3, 1937 |
| 2,139,445 | Dinwiddie | Dec. 6, 1938 |
| 2,238,944 | Muller et al. | Apr. 22, 1941 |
| 2,274,677 | Eberhart | Mar. 3, 1942 |
| 2,289,191 | Hall | July 7, 1942 |
| 2,346,138 | Morrill | Apr. 11, 1944 |
| 2,366,779 | Gaumer | Jan. 9, 1945 |
| 2,384,998 | Haugh | Sept. 18, 1945 |
| 2,431,623 | Siehrs | Nov. 25, 1947 |

FOREIGN PATENTS

| Number | Country | Date |
|---|---|---|
| 15,231 | Australia | Aug. 22, 1928 |
| 163,549 | Great Britain | May 26, 1921 |